Patented Feb. 6, 1934

1,946,148

UNITED STATES PATENT OFFICE

1,946,148

METHOD OF COATING

Martin Tosterud, Arnold, Pa., assignor to Aluminum Company of America, Pittsburgh, Pa., a corporation of Pennsylvania No Drawing. Application May 26, 1932
Serial No. 613,791

4 Claims. (Cl. 148—6)

The invention relates to methods of treating oxide coatings, composed in substantial part of aluminum oxide, to alter or modify the properties and characteristics of the coatings. Particularly is the invention concerned with the treatment of oxide coatings formed on aluminum and aluminum base alloy surfaces, herein collectively referred to as aluminum surfaces.

By several known processes, aluminum surfaces may be provided with what is generally termed an oxide coating. This coating is substantially composed of aluminum oxide. It may contain, because of the process used, other components which essentially alter its specific characteristics. Such oxide coatings have, as general properties, a good resistance to corrosion, a good resistance to abrasion, and an ability, in various degrees, to take organic dyes or inorganic colors to form a colored surface. The oxide coatings are more or less permeable and will adsorb or absorb moisture or liquids. Quite often, also, the coating forms an excellent insulation against the passage of electric current.

The oxide coatings may be formed on aluminum surfaces by various methods. The aluminum may be made an anode in an electrolytic cell containing an electrolyte such as sulfuric acid, chromic acid, organic acids, acid salts, etc. When external electrical energy is impressed upon the cell an oxide coating is formed on the aluminum anode. In another method the aluminum is immersed in a solution, generally alkaline, and the oxide coating is formed by chemical reaction without the use of external electrical energy. Other processes are known and used to artificially produce these oxide coatings. The present invention relates only to oxide coatings produced by artificial means, as distinguished from the natural film of oxide occurring on all aluminum surfaces, which natural film is not herein referred to as an oxide coating.

The oxide-coated aluminum surface may then be immersed in organic dyes, or in solutions of dyes and mordants, to produce characteristic colors. The oxide coating may likewise be treated to precipitate in the pores thereof soluble or insoluble substances which may either color the coating, render it less permeable, or increase its corrosion resistance. Other treatments designed to create some new property in the oxide coating or to enhance or increase an existing property are also used.

One of the most useful treatments of oxide-coated aluminum surfaces is to color the coating either by depositing therein a substance of characteristic color or by treating the oxide-coated surface with solutions of organic dyes which are adsorbed in or on the coating and produce characteristic colors. Another useful treatment of the oxide-coated aluminum surface is to deposit in the coating a corrosion-inhibiting substance such as a chromate or a silicate, which deposited substance increases the corrosion resistant property of the coating. In such treatments as these the substances adsorbed in or on the coating are somewhat prone under some conditions of use, and particularly when exposed to the action of moisture or the weather, to leach out of the coating and while, in many cases, this disadvantage is not pronounced, it is in some cases detrimental to the commercial use of oxide-coated aluminum surfaces which are colored or which have deposited in their pores a corrosion-inhibiting substance.

The object of the present invention is to provide a method of treating oxide-coated aluminum to deposit in the pores thereof a substance and to thereafter treat said oxide-coated aluminum surface to so alter or modify its characteristics that the substance deposited therein will be substantially permanently retained in the coating.

The invention is predicated upon the discovery that when an oxide coating is formed on an aluminum surface and a substance, whether colored or otherwise, is deposited in said coating, a substantial portion of the deposited substance may be substantially permanently retained therein if the oxide-coated aluminum surface is thereafter treated with water held at temperatures above about 80° centigrade. Under these conditions, it has been discovered, a substantial portion of the substance originally deposited in the oxide coating may be satisfactorily retained during the treatment. The substance is more or less permanently bound in the coating and will not be further leached out or affected by the action of moisture or weather, excepting, of course, the possible action of light or sun on the coloring substance.

In the practice of the invention an oxide coating is first formed on the aluminum in any known manner. If a colored coating is desired the oxide-coated aluminum surface is then immersed in the solution of an organic dye, or a colored inorganic pigment is precipitated in the pores of the coating. After this treatment the now colored oxide-coated aluminum surface is immersed in water held at temperatures above about 80° to 100° centigrade and is treated in said water for a period of time which may be readily predetermined but which is usually, in commercial application, about 5 to 40 minutes.

If a colored coating is not desired but a substance is to be deposited in the coating to decrease its permeability or increase its corrosion resistance, the oxide coating is first formed upon the aluminum and the oxide-coated aluminum surface is then treated to deposit in the pores, either by precipitation or by adsorption, or by other means, the desired substance, and thereafter the thus treated oxide-coated aluminum is immersed in water held at temperatures above about 80° centigrade until the desired result is obtained. Usually the period of treatment is about 5 to 40 minutes.

Oxide-coated aluminum surfaces having a substance deposited in and on the oxide coating, when treated in the above manner and in accordance with the invention, retain the deposited substance for longer periods and under more rigorous conditions than the substance would be retained if the oxide-coated aluminum surface had not been treated in accordance with the principles of the invention.

Moreover, during the treatment in water held at above about 80° centigrade, a substantial amount of the substance deposited in the oxide coating is not dissolved or leached out by the water and thus all of the material advantages incident to the deposition in the oxide coating of the aforementioned substances may be retained while at the same time the properties of the oxide-coated article are so changed as to materially increase their usefulness.

I claim:

1. The method of coating which comprises forming on an aluminum surface an adsorbent oxide coating, depositing an organic dye in said oxide coating, and thereafter treating the said oxide-coated aluminum surface in water held at temperatures above about 80° centigrade.

2. The method of producing an aluminum article provided on its surface with an aluminum oxide coating having an adsorbed soluble substance substantially permanently bound therein, comprising producing on said aluminum surface an adsorbent, amorphous aluminum oxide coating by anodic oxidation, adsorbing in said coating the desired soluble substance by treating with a solution of said substance, and subsequently reducing the permeability of the oxide coating by treating in water held at a temperature of about 80° to 100° centigrade.

3. The method of producing an aluminum article provided on its surface with an aluminum oxide coating having an adsorbed soluble coloring substance substantially permanently bound therein comprising producing on said aluminum surface an adsorbent, amorphous aluminum oxide coating by anodic oxidation, adsorbing in said coating the desired soluble substance by treating with a solution of said substance, and subsequently reducing the permeability of the oxide coating by treating in water held at a temperature of about 80° to 100° centigrade.

4. The method of producing an aluminum article provided on its surface with an aluminum oxide coating having an adsorbed soluble corrosion-inhibiting substance substantially permanently bound therein comprising producing on said aluminum surface an adsorbent, amorphous aluminum oxide coating by anodic oxidation, adsorbing in said coating the desired soluble substance by treating with a solution of said substance, and subsequently reducing the permeability of the oxide coating by treating in water held at a temperature of about 80° to 100° centigrade.

MARTIN TOSTERUD.